(12) United States Patent
Lee et al.

(10) Patent No.: US 10,423,288 B2
(45) Date of Patent: *Sep. 24, 2019

(54) DISPLAY DEVICE WITH INTEGRATED TOUCH SCREEN AND METHOD FOR DRIVING THE SAME

(71) Applicant: LG Display Co., Ltd., Seoul (KR)

(72) Inventors: JungHan Lee, Paju-si (KR); HongChul Kim, Gunpo-si (KR); SungChul Kim, Paju-si (KR); JeongSeop Lee, Gimje-si (KR); SeungEun Pyo, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,984

(22) Filed: Dec. 21, 2018

(65) Prior Publication Data

US 2019/0129540 A1 May 2, 2019

Related U.S. Application Data

(63) Continuation of application No. 15/875,696, filed on Jan. 19, 2018, now Pat. No. 10,209,842, which is a
(Continued)

(30) Foreign Application Priority Data

Feb. 20, 2012 (KR) ........................ 10-2012-0016908

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/044; G06F 3/0412; G06F 3/0416
See application file for complete search history.

(56) References Cited

U.S. PATENT DOCUMENTS

| | | |
|---|---|---|
| 5,392,058 A | 2/1995 | Tagawa |
| 6,201,529 B1 | 3/2001 | Shimizu |

(Continued)

FOREIGN PATENT DOCUMENTS

| | | |
|---|---|---|
| CN | 101017419 A | 8/2007 |
| CN | 102193669 A | 9/2011 |

(Continued)

OTHER PUBLICATIONS

First Office Action for Chinese Patent Application No. CN 201510648534.X, dated Dec. 5, 2017, 15 Pages.
(Continued)

*Primary Examiner* — Sejoon Ahn
(74) *Attorney, Agent, or Firm* — Fenwick & West LLP

(57) ABSTRACT

Discussed are a display device with an integrated touch screen and a method of operating the same. The display device according to an embodiment includes a display panel including a plurality of pixel electrodes; a touch screen including m number of electrodes which are formed to overlap with the plurality of pixel electrodes, wherein m is a multiple of n, and n is an integer equal to or greater than two, and wherein the m electrodes are divided into n number of electrode groups; a touch driver configured to generate a touch scan signal and to supply the generated touch scan signal to a display driver; and the display driver configured to apply a common voltage or the touch scan signal to one or more of the m electrodes depending on a driving mode of the display device.

2 Claims, 7 Drawing Sheets

Related U.S. Application Data continuation of application No. 14/968,681, filed on Dec. 14, 2015, now Pat. No. 9,910,549, which is a continuation of application No. 13/448,021, filed on Apr. 16, 2012, now Pat. No. 9,377,906.

(56) References Cited

U.S. PATENT DOCUMENTS

| | | |
|---|---|---|
| 9,874,986 B2 | 1/2018 | Guedon et al. |
| 2006/0012575 A1 | 1/2006 | Knapp et al. |
| 2008/0055267 A1 | 3/2008 | Wu et al. |
| 2009/0167713 A1 | 7/2009 | Edwards |
| 2010/0026660 A1 | 2/2010 | Kitamura |
| 2010/0144391 A1 | 6/2010 | Chang et al. |
| 2010/0182273 A1 | 7/2010 | Noguchi et al. |
| 2010/0194697 A1 | 8/2010 | Hotelling et al. |
| 2010/0225612 A1* | 9/2010 | Ishizaki ............ G02F 1/13338 345/174 |
| 2010/0253638 A1 | 10/2010 | Yousefpor et al. |
| 2011/0025635 A1 | 2/2011 | Lee |
| 2011/0102360 A1 | 5/2011 | Chen et al. |
| 2011/0134067 A1 | 6/2011 | Joguet et al. |
| 2011/0169769 A1 | 7/2011 | Takahashi |
| 2011/0227858 A1 | 9/2011 | An et al. |
| 2011/0254795 A1 | 10/2011 | Chen et al. |
| 2011/0267295 A1 | 11/2011 | Noguchi et al. |
| 2011/0267305 A1 | 11/2011 | Shahparnia et al. |
| 2011/0291977 A1 | 12/2011 | Moriwaki |
| 2012/0019474 A1 | 1/2012 | Hsieh et al. |
| 2012/0044166 A1 | 2/2012 | Mizuhashi et al. |
| 2012/0162121 A1* | 6/2012 | Chang .................. G06F 3/0416 345/174 |
| 2012/0206403 A1 | 8/2012 | Wang et al. |
| 2012/0242597 A1 | 9/2012 | Hwang et al. |
| 2012/0280965 A1* | 11/2012 | Lee ..................... G09G 3/3677 345/212 |
| 2012/0313881 A1 | 12/2012 | Ge et al. |
| 2013/0037330 A1 | 2/2013 | Singh |
| 2013/0147724 A1 | 6/2013 | Hwang et al. |

FOREIGN PATENT DOCUMENTS

| | | |
|---|---|---|
| CN | 102236487 | 11/2011 |
| CN | 103164076 | 6/2013 |
| EP | 2 075 678 A2 | 7/2009 |
| EP | 2 336 864 A1 | 6/2011 |
| KR | 10-0955339 B1 | 4/2010 |
| KR | 10-2010-0127164 A | 12/2010 |
| KR | 10-2011-0100377 A | 9/2011 |
| KR | 10-2011-0120219 A | 11/2011 |
| KR | 10-1212420 B1 | 12/2012 |
| TW | 200945147 A | 11/2009 |
| TW | 201120507 | 6/2011 |

OTHER PUBLICATIONS

First Office Action for Chinese Patent Application No. CN 201210191249.6, dated Apr. 27, 2015, 11 Pages.

Office Action for Taiwan Patent Application No. TW 10320914960, dated Jul. 4, 2014, 22 Pages.

Office Action for U.S. Appl. No. 13/448,021, dated Dec. 3, 2015, 13 Pages.

Office Action for U.S. Appl. No. 13/448,021, dated May 26, 2015, 14 Pages.

Office Action for U.S. Appl. No. 13/448,021, dated Sep. 16, 2014, 13 Pages.

Office Action for U.S. Appl. No. 13/448,021, dated May 19, 2014, 10 Pages.

Office Action for U.S. Appl. No. 14/968,681, dated Jun. 30, 2017, 20 Pages.

Office Action for U.S. Appl. No. 14/968,681, dated Feb. 23, 2017, 19 Pages.

Office Action for U.S. Appl. No. 14/968,681, dated Nov. 3, 2016, 14 Pages.

Office Action for U.S. Appl. No. 14/968,681, dated Apr. 22, 2016, 9 Pages.

* cited by examiner

: Odd_CH1     : Even_CH2

| 1 | 17 | 33 | 49 | 65 | 81 | 97 | 113 | 129 | 145 |
|---|---|---|---|---|---|---|---|---|---|
| 2 | 18 | 34 | 50 | 66 | 82 | 98 | 114 | 130 | 146 |
| 3 | 19 | 35 | 51 | 67 | 83 | 99 | 115 | 131 | 147 |
| 4 | 20 | 36 | 52 | 68 | 84 | 100 | 116 | 132 | 148 |
| 5 | 21 | 37 | 53 | 69 | 85 | 101 | 117 | 133 | 149 |
| 6 | 22 | 38 | 54 | 70 | 86 | 102 | 118 | 134 | 150 |
| 7 | 23 | 39 | 55 | 71 | 87 | 103 | 119 | 135 | 151 |
| 8 | 24 | 40 | 56 | 72 | 88 | 104 | 120 | 136 | 152 |
| 9 | 25 | 41 | 57 | 73 | 89 | 105 | 121 | 137 | 153 |
| 10 | 26 | 42 | 58 | 74 | 90 | 106 | 122 | 138 | 154 |
| 11 | 27 | 43 | 59 | 75 | 91 | 107 | 123 | 139 | 155 |
| 12 | 28 | 44 | 60 | 76 | 92 | 108 | 124 | 140 | 156 |
| 13 | 29 | 45 | 61 | 77 | 93 | 109 | 125 | 141 | 157 |
| 14 | 30 | 46 | 62 | 78 | 94 | 110 | 126 | 142 | 158 |
| 15 | 31 | 47 | 63 | 79 | 95 | 111 | 127 | 143 | 159 |
| 16 | 32 | 48 | 64 | 80 | 96 | 112 | 128 | 144 | 160 |

DISPLAY DEVICE WITH INTEGRATED TOUCH SCREEN AND METHOD FOR DRIVING THE SAME

CROSS-REFERENCE TO RELATED APPLICATIONS

This application is a continuation application of U.S. patent application Ser. No. 15/875,696 filed on Jan. 19, 2018, which is a continuation application of U.S. patent application Ser. No. 14/968,681 filed on Dec. 14, 2015 (now U.S. Pat. No. 9,910,549 issued on Mar. 6, 2018), which is a continuation application of U.S. patent application Ser. No. 13/448,021 filed on Apr. 16, 2012 (now U.S. Pat. No. 9,377,906 issued on Jun. 28, 2016), which claims the priority benefit of Korean Patent Application No. 10-2012-0016908 filed on Feb. 20, 2012, all of which are hereby incorporated by reference herein.

BACKGROUND

Field of the Invention

The present invention relates to a display device, and more particularly, to a display device with an integrated touch screen and a driving method thereof.

Discussion of the Related Art

Touch screens are a type of input device that is included in image display devices such as Liquid Crystal Displays (LCDs), Field Emission Displays (FEDs), Plasma Display Panel (PDPs), Electroluminescent Displays (ELDs), and Electrophoretic Display (EPDs), and allows a user to input predetermined information by applying a pressure (i.e., by pressing or touching) to a touch sensor of a touch screen of the image display device while looking at the image display device.

Particularly, the demand of display devices with an integrated in-cell type touch screen, which include a plurality of built-in elements configuring the touch screen for providing slim portable terminals such as smart phones and tablet Personal Computers (PCs), is recently increasing.

Hereinafter, a related art display device with an integrated touch screen will be described with reference to FIG. 1.

FIG. 1 is a diagram illustrating a configuration of a related art display device with an integrated touch screen, and more specifically illustrates a configuration of a display device with an integrated self-capacitive touch screen having an in-cell type.

The related art display device with the integrated self-capacitive touch screen having an in-cell type, as illustrated in FIG. 1, includes: a panel 10 with a built-in touch screen 11; a display driver IC (DD-IC) 20 that is connected to an external system and controls a plurality of gate lines and data lines in the panel 10; a plurality of touch ICs (T-IC1 and T-IC2) 31 and 32 that drive the touch screen 11 in the panel 10.

The panel 10 includes m number of electrodes 12, and m number of lines 13 that are respectively extended from the m electrodes 12. Each of the touch ICs 31 and 32 includes m number of touch IC channels respectively corresponding to the m lines 13, for self-capacitive touch sensing.

Since one touch IC channel generally corresponds a line connected to an electrode in one-to-one correspondence relationship, as illustrated in FIG. 1, when the number of lines connected to an electrode is more than the number of channels that are capable of being accommodated by one touch IC, a plurality of touch ICs are required to be used, causing the increase in cost.

In the display device with the integrated touch screen of FIG. 1, each of the electrodes 12 is built in the panel 10 and performs a touch function and a display function, and thus is used as a common electrode for display driving when the display device is driven in a display driving mode, or is used as a touch electrode when the display device is driven in a touch driving mode. The display driving mode is a display mode for displaying images on the display device, and the touch driving mode is a touch mode for detecting and processing a touch input to the display device.

On the contrary, when the display device is driven in the display driving mode, a common voltage Vcom outputted from inside the display driver IC (DD-IC) 20 is applied to the electrodes 12 through the touch ICs 31 and 32, in which case the touch ICs 31 and 32 need to accommodate a negative voltage when the common voltage Vcom is the negative voltage.

However, the related art touch ICs 31 and 32 cannot accommodate a negative voltage and thus, a special manufacturing process and design for a touch IC that can accommodate the negative voltage are needed, which in turn increases the manufacturing cost of the touch ICs.

Moreover, when the related art touch sensitive display device is driven in the display driving mode, a ground-level voltage instead of a negative voltage may be incidentally supplied to the electrode 12 through the touch IC, thereby causing the degradation of image quality.

To provide a summary on the above-described limitations, the related art display device with the integrated touch screen has at least the following limitations.

First, as the number of touch IC channels matching the respective lines connected to electrodes increases, the number of touch ICs increases, thereby causing the increase in cost for the display device.

Second, a touch IC is separately manufactured by modifying the manufacturing process and design thereof for applying a negative common voltage, thereby causing the increase in the manufacturing cost of the touch IC.

Third, when the related art touch IC is applied to a display device, the ground-level common voltage, instead of the desired negative common voltage, may be incidentally applied to the electrodes in the display driving mode, thereby causing the degradation of image quality.

SUMMARY

Accordingly, the present invention is directed to provide a display device with an integrated touch screen that substantially obviates one or more problems due to limitations and disadvantages of the related art.

An aspect of the present invention is directed to provide a display device with an integrated touch screen, which applies a common voltage or a touch scan signal to a plurality of electrodes through a switching unit that is connected to at least two or more electrode groups of a self-capacitive touch screen.

Another aspect of the present invention is directed to provide a display device with an integrated touch screen, which enables the reduction in the number of touch IC channels that connect a display driver IC and a touch IC by using only one touch IC.

Another aspect of the present invention is directed to provide a display device with an integrated touch screen, which applies a common voltage directly from a display driver IC to an electrode without applying the common voltage to the electrode though a touch IC, thus preventing image quality from being degraded.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided according to an embodiment a display device with an integrated touch screen including: a touch screen including m number of electrodes which are formed to respectively overlap with a plurality of pixel electrodes in a pixel area of a panel, m being a multiple of n wherein n is an integer more than or equal to two; a display driver IC applying a common voltage to the electrodes, or applying a touch scan signal sequentially to n number of groups into which the m electrodes are divided, according to a driving mode of the panel; and a touch IC generating the touch scan signal to apply the touch scan signal to the display driver IC.

When the driving mode is a display driving mode, each of the electrodes may operate as a common electrode, or when the driving mode is a touch driving mode, each of the electrodes may operate as a touch electrode.

The number of electrodes included in each of the groups may be m/n number. The n groups may be block type groups. The groups may be divided and formed in a short side direction of the pixel area.

The display driver IC may include: a common voltage generator generating the common voltage; a sync signal generator generating a sync signal indicating the driving mode; a switching control signal generator generating a control signal which allows the electrodes to be simultaneously connected to the common voltage generator or allows the electrodes to be sequentially connected to the touch IC for each group, according to the sync signal; and a switching unit operating according to the sync signal and the control signal.

The switching unit may include a plurality of first switching units and a plurality of second switching units, the first switching units being connected to the common voltage generator and the touch IC, and the second switching units being connected to the respective first switching units and one electrode for each group. When the sync signal is a first sync signal indicating the display driving mode, the first switching units may connect the common voltage generator to the second switching units, or when the sync signal is a second sync signal indicating the touch driving mode, the first switching units may connect the touch IC to the second switching units. When the control signal is a first control signal conforming to the first sync signal, the second switching units may connect the respective electrodes to the first switching units, or when the control signal is a second control signal conforming to the second sync signal, the second switching units may sequentially connect the respective electrodes to the first switching units for each group.

The second control signal may include n number of group selection signals which allow the first switching units to be respectively connected to the electrodes for each group.

Each of the second switching units may include a plurality of CMOS transistors, and control respective gates of the CMOS transistors to simultaneously connect the first switching units and the groups or sequentially connect the first switching units and the groups for each group. The number of first switching units may be m/n number.

In another aspect of the present invention, there is provided a driving method of a display device with an integrated touch screen, which includes: a touch screen including m number of electrodes in a pixel area of a panel (where m is a multiple of n and n is an integer more than or equal to two); a display driver IC applying a common voltage or a touch scan signal to the electrodes; and a touch IC generating the touch scan signal to apply the touch scan signal to the display driver IC, the method including: applying the common voltage to the electrodes when a driving mode of the panel is a display driving mode; and sequentially applying the touch scan signal to n number of groups into which the electrodes are divided, when the driving mode of the panel is a touch driving mode.

The number of electrodes included in each of the groups may be m/n number. The n groups may be block type groups. The groups may be divided and formed in a short side direction of the pixel area.

The applying of the common voltage may include: generating the common voltage; generating a first sync signal according to the display driving mode, and generating a first control signal according to the first sync signal; switching a first switching unit to output the common voltage according to the first sync signal; and switching a second switching unit to simultaneously apply the common voltage, outputted from the first switching unit, to the electrodes according to the first control signal.

The applying of the touch scan signal may include: generating the touch scan signal; generating a second sync signal according to the touch driving mode, and generating a second control signal according to the second sync signal; switching a first switching unit to output the touch scan signal according to the second sync signal; and switching a second switching unit to sequentially apply the touch scan signal, outputted from the first switching unit, to the n groups according to the second control signal.

According to an embodiment, the present invention provides a display device with integrated touch screen, including: a display panel including a plurality of pixel electrodes; a touch screen including m number of electrodes which are formed to overlap with the plurality of pixel electrodes, wherein m is a multiple of n, and n is an integer equal to or greater than two, and wherein the m electrodes are divided into n number of electrode groups; a touch driver configured to generate a touch scan signal and to supply the generated touch scan signal to a display driver; and the display driver configured to apply a common voltage or the touch scan signal to one or more of the m electrodes depending on a driving mode of the display device.

According to an embodiment, the present invention provides a method of operating a display device, the display device including a display panel including a plurality of pixel electrodes and a touch screen including m number of electrodes which are formed to overlap with the plurality of pixel electrodes, wherein m is a multiple of n, and n is an integer equal to or greater than two, the display device further including a touch driver and a display driver, the method including: dividing the m electrodes into n number of electrode groups; generating, by the touch driver, a touch scan signal; and applying, by the display driver, a common voltage or the generated touch scan signal to one or more of the m electrodes depending on a driving mode of the display device, wherein when the generated touch scan signal is applied to the one or more of the m electrodes, the touch scan signal is selectively applied to each of the electrode groups.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

In a display device with an integrated touch screen according to an embodiment of the present invention, a plurality of electrodes are divided into n number of groups, and a touch scan signal is sequentially applied to the n groups. However, for convenience of a description, the below description will be made on a method where the electrodes are divided into two groups (i.e., n=2). However, the present invention is not limited to the method where the electrodes are divided into the two groups, and the electrodes may be divided into three or more groups.

Figure 2:
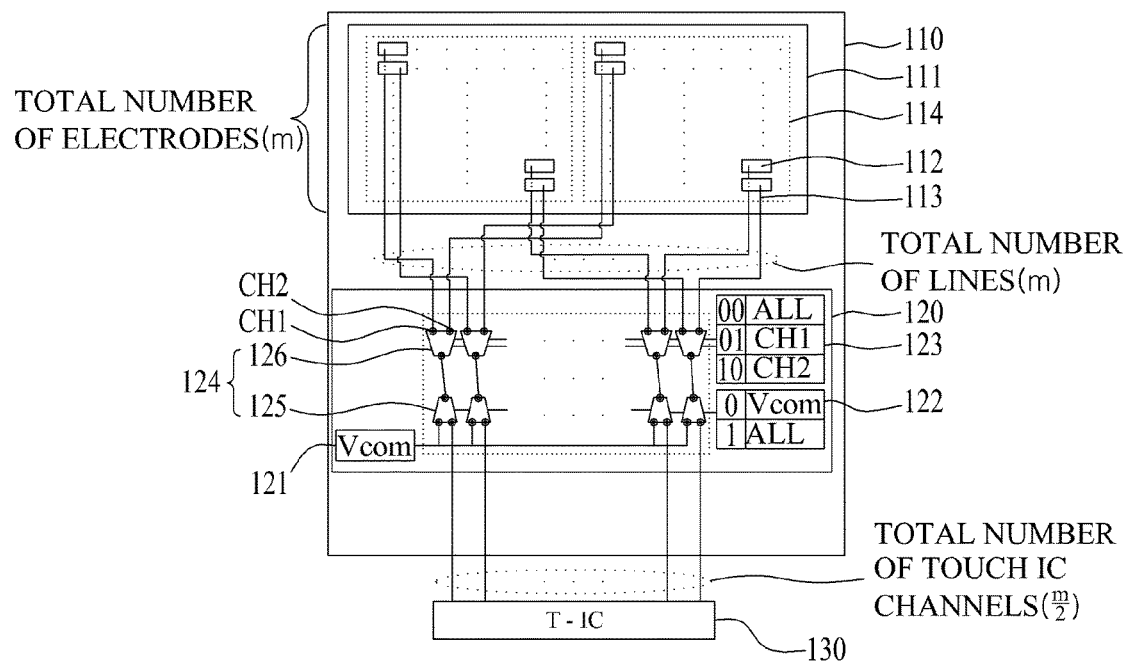
FIG. 2 is a diagram illustrating a configuration of a display device with an integrated touch screen according to an embodiment of the present invention.

FIG. 2 is a diagram illustrating a configuration of a display device with an integrated touch screen according to an embodiment of the present invention.

The display device with the integrated touch screen according to an embodiment of the present invention, as illustrated in FIG. 2, includes: a touch screen 111 that includes m number of electrodes 112 (where m is a multiple of n, and n is an integer more than or equal to two) which are formed to respectively overlap with a plurality of pixel electrodes in a pixel area of a display panel 110; a display driver IC 120 that applies a common voltage Vcom to the electrodes 112 or sequentially applies a touch scan signal to the electrodes of each of two groups 114 into which the m electrodes 112 are divided, according to a driving mode of the panel 110; and a touch IC 130 that generates the touch scan signal and applies the touch scan signal to the display driver IC 120.

The touch screen 111 detects a touch point of a user. Particularly, the touch screen 111 applied to the present embodiment is an in-cell type touch screen using a self-capacitive type, and a touch screen area is the same area as a pixel array area. The self-capacitive touch screen includes the m electrodes 112 and the same m number of lines 113, in the panel 110.

Herein, the panel 110 may be configured in a structure where a liquid crystal layer is formed between two substrates. In this case, a lower substrate of the panel 110 can include: a plurality of data lines disposed in parallel to each other; a plurality of gate lines that cross the data lines and are disposed in parallel to each other; a plurality of Thin Film Transistors (TFTs) that are respectively formed in a plurality of intersection areas between the data lines and the gate lines; a plurality of pixel electrodes that respectively charge data voltages into the plurality of pixels; an electrode (also referred to as a common electrode) that drives liquid crystal cells injected into the liquid crystal layer, together with the operation of the pixel electrodes. The pixels are arranged in a matrix type corresponding to the above-described intersection structure between the date lines and the gate lines.

The m electrodes 112 are formed to overlap with the plurality of pixel electrodes, in the pixel array area of the panel 110. For instance, the m electrodes are not formed in each pixel but are formed in an area overlapping with a plurality of pixels. That is, the m electrodes 112 are preferably disposed over the area where the pixel electrodes are disposed. The m electrodes 112 may be disposed substantially through the touch screen 111 so that a touch input thereto may be accurately detected.

When the driving mode of the panel 110 is a display driving mode, each of the electrodes 112 operates as a common electrode that drives liquid crystal cells together with the operation of the pixel electrode(s) formed in corresponding pixel(s). When the driving mode of the panel 110 is a touch driving mode, each electrode 112 operates as a touch electrode that detects a touch point/input by using the touch scan signal applied from the touch IC 130.

For example, as illustrated in FIG. 2, the m electrodes 112 may be formed to be divided into two groups 114, and formed in a block type group 114 but the group can be in a different shape. Each of the groups 114 may be formed in a touch screen 111 area, and the number of electrodes included in each group 114 is m/2. In FIG. 2, the number of electrodes in each of two groups into which the electrodes 112 are divided is m/2, but when the electrodes 112 are divided into n number of groups, the number of electrodes in each of the n groups is m/n, where m and n are positive integers and preferably m is a multiple of n to provide an even division.

The m lines 113 connect the m electrodes 112 to the display driver IC 120, respectively. Therefore, the common voltage and the touch scan signal that are outputted from the display driver IC 120 are applied to the electrodes 112 through the respective lines 113.

When the driving mode of the panel 110 is in the display driving mode, the display driver IC 120 applies the common voltage to the electrodes 112, and when the driving mode of the panel 110 is in the touch driving mode, the display driver IC 120 sequentially applies the touch scan signal to the electrodes of each of the two groups into which the electrodes 112 are divided. Embodiments of a group division method according to the present invention will be described below in detail.

The display driver IC 120 drives the data lines and gate lines that are formed in the panel 110, and drives each of the m electrodes 112 as a common electrode or a touch electrode. For this end, the display driver IC 120 may include a common voltage generator 121, a sync signal generator 122, a switching control signal generator 123, and a switching unit 124.

The common voltage generator 121 generates a common voltage Vcom and applies the common voltage Vcom to the switching unit 124. Specifically, when the driving mode of the panel 110 is in the display driving mode, the common voltage generator 121 generates the common voltage Vcom which is then applied to the m electrodes 112 for image output, and applies the common voltage Vcom to the switching unit 124.

The sync signal generator 122 generates a sync signal indicating the driving mode of the panel 110. For example, as illustrated in FIG. 2, when the driving mode of the panel 110 is in the display driving mode, the sync signal generator 122 generates a first sync signal "0" that allows the common voltage Vcom of the common voltage generator 121 to be applied to the electrodes 112 through the switching unit 124. When the driving mode of the panel 110 is in the touch driving mode, the sync signal generator 122 generates a second sync signal "1" that allows the touch scan signal of the touch IC 130 to be applied to the electrodes 112.

The switching control signal generator 123 generates a control signal that allows the electrodes 112 to be simultaneously connected to the common voltage generator 121 or a control signal that allows the electrodes 112 to be sequentially connected to the touch IC 130 for each group, according to the sync signal of the sync signal generator 122. For example, as illustrated in FIG. 2, when the sync signal of the sync signal generator 123 is the first sync signal "0", the switching control signal generator 123 generates a first control signal "00" that allows the common voltage (received from the common voltage generator 121) to be simultaneously applied to the m electrodes 112. When the sync signal of the sync signal generator 123 is the second sync signal "1", the switching control signal generator 123 generates a second control signal "01" or "10" that allows the touch scan signal (received from the touch IC 130) to be sequentially applied to the two electrode groups 114. The second control signal may be generated in plurality, according to the number of groups that are connected to the switching unit 124. In other words, in this example, the second control signal denotes two group selection signals ("01" and "10") that allow the switching unit 124 to be connected to the electrodes 112 by two groups (CH1 and CH2). However, the electrodes 112 may be divided into two or more groups. In such cases, when there are n number of groups (n being greater than or equal 2), the second control signal corresponding to n number of group selection signals that are respectively and selectively applied to the n groups is generated. For instance, if there are 3 electrode groups 114, then the group selection signals of the second control signal may be, e.g., "001", "010" and "011" which are used to respectively control the three different electrode groups via the channel outputs CH1, CH2 and CH3 of each of the second switching units 126. The switching unit 124 may be configured with a plurality of first switching units 125 and a plurality of second switching units 126. Each of the second switching units 126 includes channels CH1 and CH2. The switching unit 124 operates according to the sync signal of the sync signal generator 122 and the control signal of the switching control signal generator 123.

For example, as illustrated in FIG. 2, when the sync signal of the sync signal generator 122 is the first sync signal "0" and the control signal of the switching control signal generator 123 is the first control signal "00", the common voltage Vcom generated by the common voltage generator 121 is applied to all the electrodes 122. When the sync signal of the sync signal generator 122 is the second sync signal "1" and the control signal of the switching control signal generator 123 is the second control signal "01" or "10", the touch scan signal generated by the touch IC 130 is applied to the m electrodes 112.

More specifically, when the second control signal of the switching control signal generator 123 is the second control signal "01", the touch scan signal from the touch IC 130 is applied to the electrodes of one of the groups 114 through the channel CH1 of each of the second switching units 126. On the other hand, when the second control signal of the switching control signal generator 123 is the second control signal "10", the touch scan signal is applied to the electrodes of the other one of the groups 114 through the channel CH2 of each of the second switching units 126.

The detailed configurations and operations of the first switching units 125 and second switching units 126 of the switching unit 124 will now be described in detail with reference to FIGS. 2, 3A and 3B according to an embodiment of the present invention.

Figure 3A:
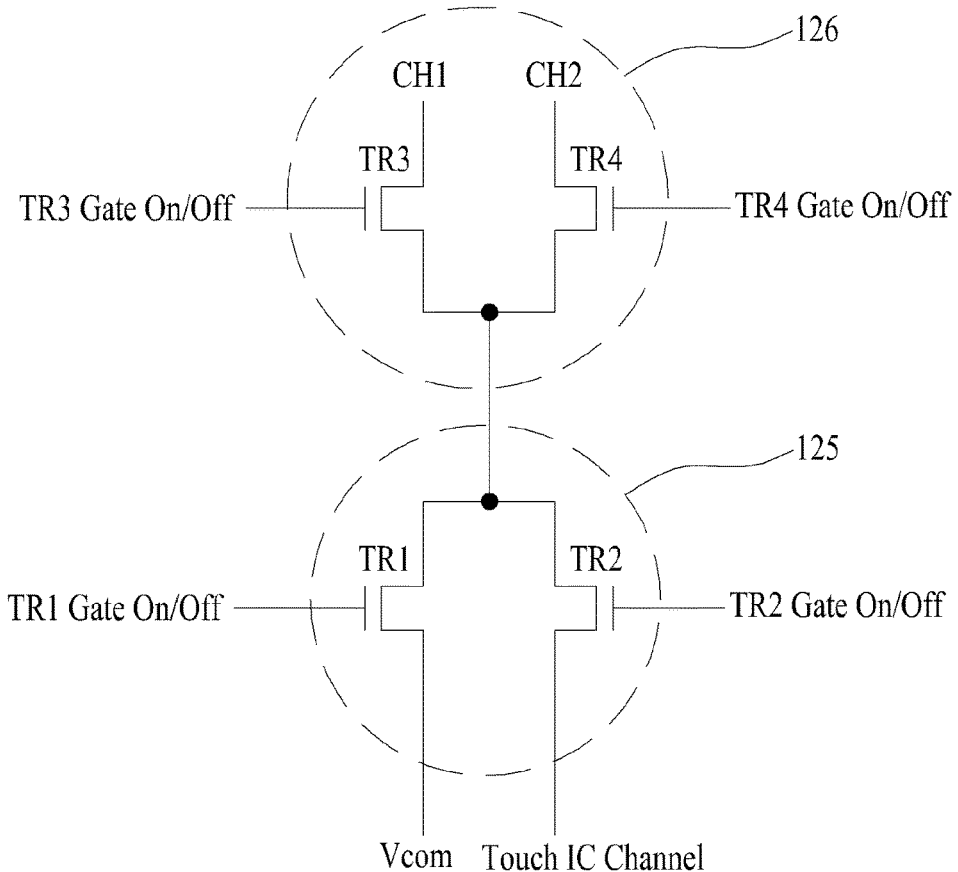
FIG. 3A is a diagram illustrating a detailed configuration of each of first and second switching units in FIG. 2.
Figure 3B:
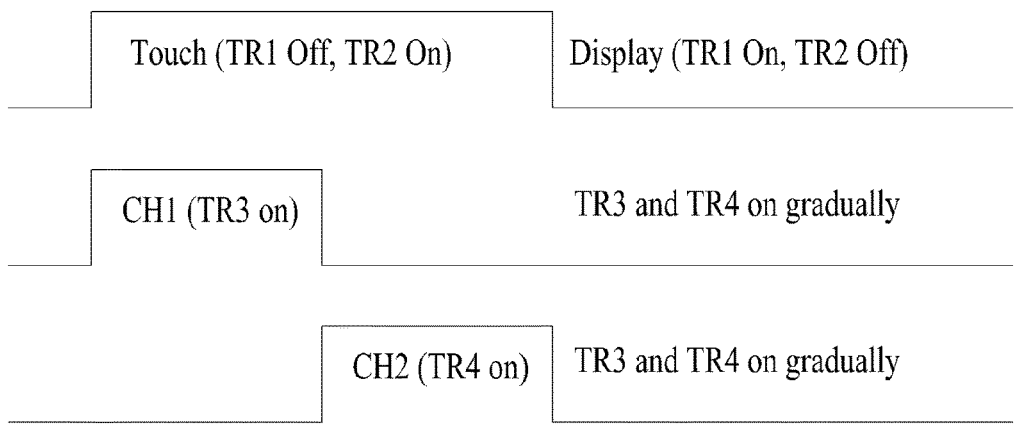
FIG. 3B is a diagram for describing an operation of each of the first and second switching units in FIG. 3A.

FIG. 3A is a diagram illustrating a detailed configuration of each of the first and second switching units in FIG. 2. FIG. 3B is a diagram for describing an operation of each of the first and second switching units in FIG. 3A.

The first switching unit 125 may be configured with a 2:1 multiplexer. For example, as illustrated in FIG. 3A, the first switching unit 125 may be configured with transistors TR1 and TR2. The transistor TR1 may be connected to the common voltage generator 121 and the second switching unit 126, and the transistor TR2 may be connected to the touch IC 130 and the second switching unit 126. Herein, each of the transistors TR1 and TR2 may be a CMOS transistor.

When the sync signal is the first sync signal "0" indicating the display driving mode, the first switching unit 125 connects the common voltage generator 121 to the second switching unit 126. When the sync signal is the second sync signal "1" indicating the touch driving mode, the first switching unit 125 connects the touch IC 130 to the second switching unit 126.

For example, when the sync signal of the sync signal generator 122 is the first sync signal "0", the transistor TR1 of the first switching unit 125 is turned on and simultaneously the transistor TR2 is turned off, and thus, the common voltage generator 121 and the second switching unit 126 are connected to each other through the transistor TR1 of the first switching unit 125, whereupon the common voltage Vcom generated by the common voltage generator 121 is delivered to the second switching unit 126. When the sync signal of the sync signal generator 122 is the second sync signal "1", the transistor TR2 of the first switching unit 125 is turned on and simultaneously the transistor TR1 is turned off, and thus, the touch IC 130 and the second switching unit 126 are connected to each other through the transistor TR2 of the first switching unit 125, whereupon the touch scan signal generated by the touch IC 130 is delivered to the second switching unit 126.

The second switching unit 126 is a signal selector that has one input channel and a plurality of output channels CH1 and CH2. The second switching unit 126 simultaneously or sequentially outputs a signal, supplied from the first switching unit 125, through the output channels CH1 and CH2. For example, as illustrated in FIG. 3A, the second switching unit 126 may be configured with transistors TR3 and TR4, which are connected to the first switching unit 125 and corresponding electrodes 112 through the lines 113. Herein, each of the transistors TR3 and TR4 may be a CMOS transistor.

The second switching unit 126 is connected only to the first switching unit 125 and one electrode for each group. When the control signal applied to the second switching unit 126 is the first control signal conforming to the first sync signal (display mode), the second switching unit 126 connects the first switching unit 125 to all the electrodes 112. When the control signal is the second control signal conforming to the second sync signal (touch mode), the second switching unit 126 sequentially connects the first switching unit 125 to a plurality of electrodes for each group 114.

For example, when the control signal of the switching control signal generator 123 is the first control signal "00" conforming to the first sync signal "0" of the sync signal generator 122, the transistors TR3 and TR4 of the second switching unit 126 are simultaneously turned on, and thus, the first switching unit 125 and all the electrodes 112 are connected to each other through the channels CH1 and CH2 of the respective transistors TR3 and TR4 in the second switching unit 126, whereupon the common voltage Vcom delivered from the first switching unit 125 is applied to all the electrodes 112 including both groups 114 simultaneously.

When the control signal of the switching control signal generator 123 is the second control signal "01" conforming to the second sync signal "1" of the sync signal generator 122, the transistor TR3 of the second switching unit 126 is turned on and simultaneously the transistor TR4 is turned off, and thus, the first switching unit 125 and the electrodes of any one of the groups 114 are connected to each other through the channel CH1 of the transistor TR3 of the second switching unit 126, whereupon the touch scan signal delivered from the first switching unit 125 is applied to all the electrodes of that one group among the groups 114.

When the control signal of the switching control signal generator 123 is the second control signal "10" conforming to the second sync signal "1" of the sync signal generator 122, the transistor TR4 of the second switching unit 126 is turned on and simultaneously the transistor TR3 is turned off, and thus, the first switching unit 125 and the electrodes of the other of the groups 114 are connected to each other through the channel CH2 of the transistor TR4 of the second switching unit 126, whereupon the touch scan signal delivered from the first switching unit 125 is applied to all the electrodes of the other group among the groups 114.

Referring again to FIG. 2, the touch IC 130 applies the touch scan signal to the electrodes 112 through display driver IC 120, and then detects the change in the capacitance of each electrode to determine whether an electrode area is touched. The touch IC 130 and the display driver IC 120 are connected to each other through the touch IC channels, and the total number of touch IC channels is m/2. That is, in the related art, the number of electrodes or lines is equal to the number of touch IC channels, but in the present invention, the number of touch IC channels decreases to a half of the number of electrodes 112 or lines 113, which reduces the manufacturing cost and structure configuration.

Figure 1:
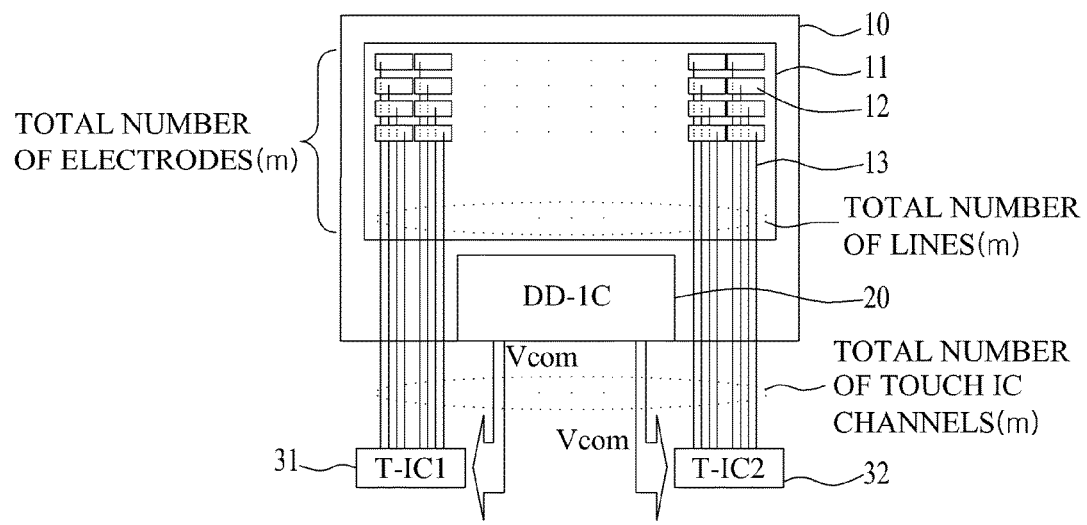
FIG. 1 is a diagram illustrating a configuration of a related art display device with an integrated touch screen.

Hereinafter, an electrode division method will now be described in detail with reference to FIGS. 4 to 8 according to an embodiment of the present invention. These methods can be implemented using the devices of FIGS. 1-3 or other suitable display devices.

Figure 4:
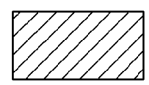
FIG. 4 is a diagram showing a first embodiment of an electrode division method in a display device with integrated touch screen according to an embodiment of the present invention.
Figure 4:
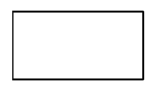
Figure 5A:
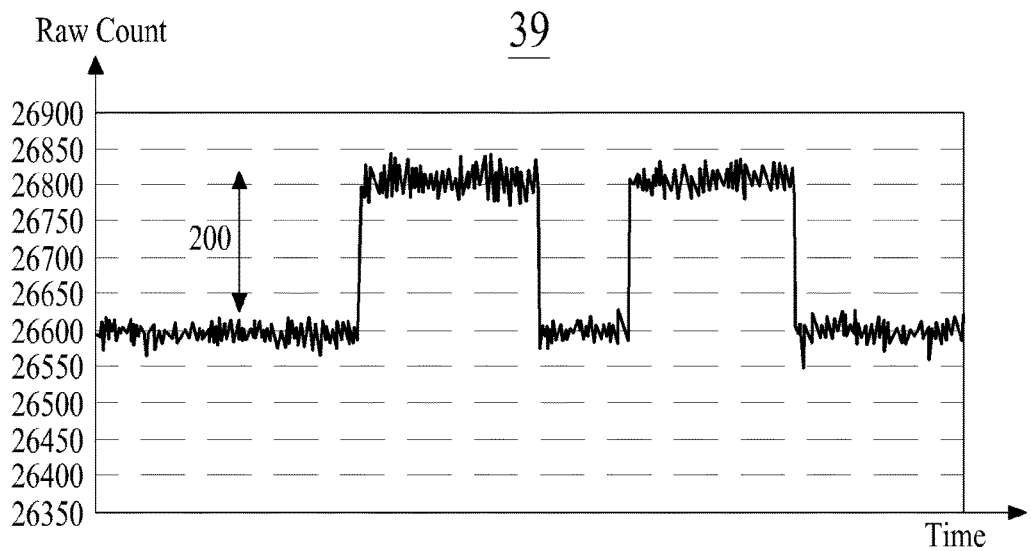
FIGS. 5A to 5D are diagrams respectively showing an example of experiment data of touch sensitivity according to the method of FIG. 4.
Figure 5B:
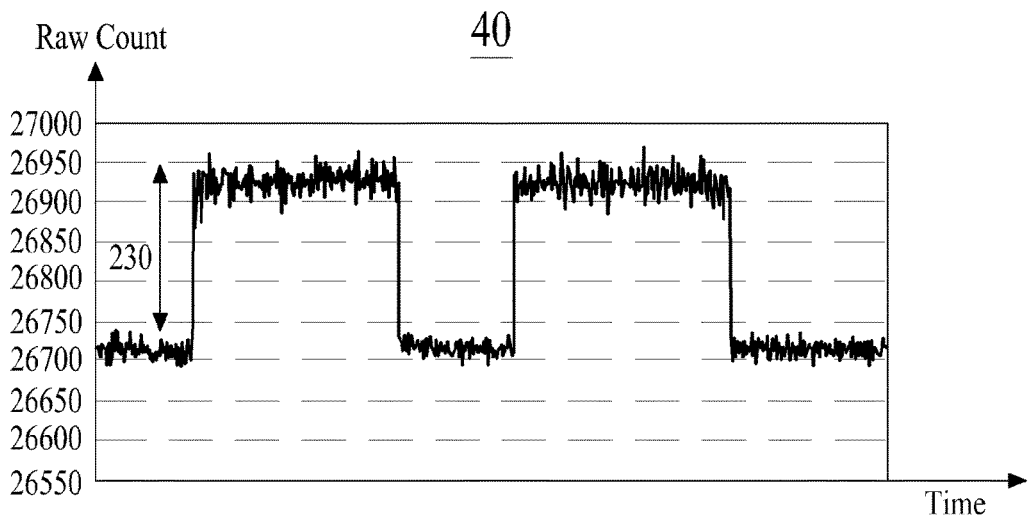
Figure 5C:
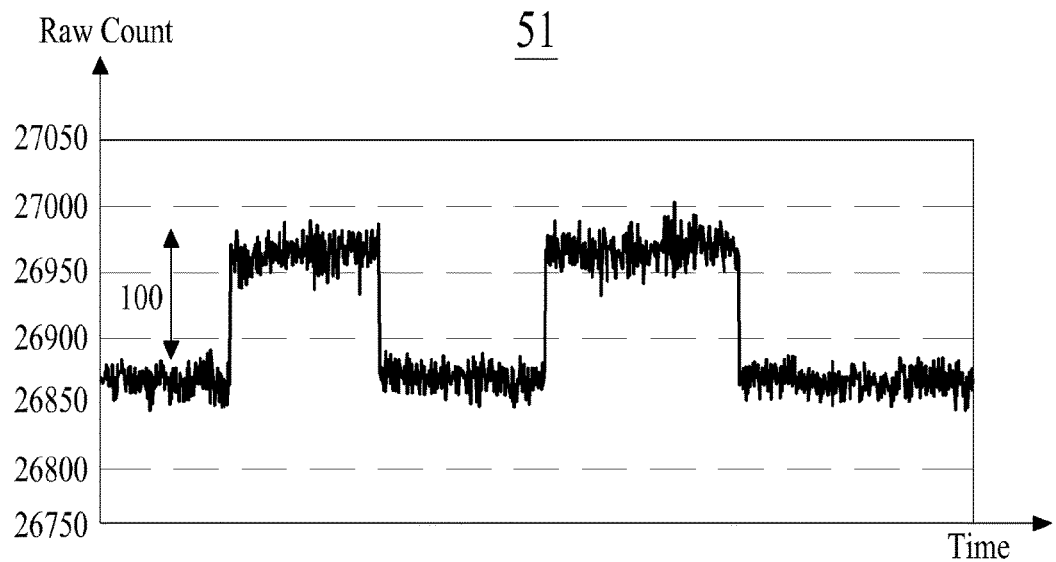
Figure 5D:
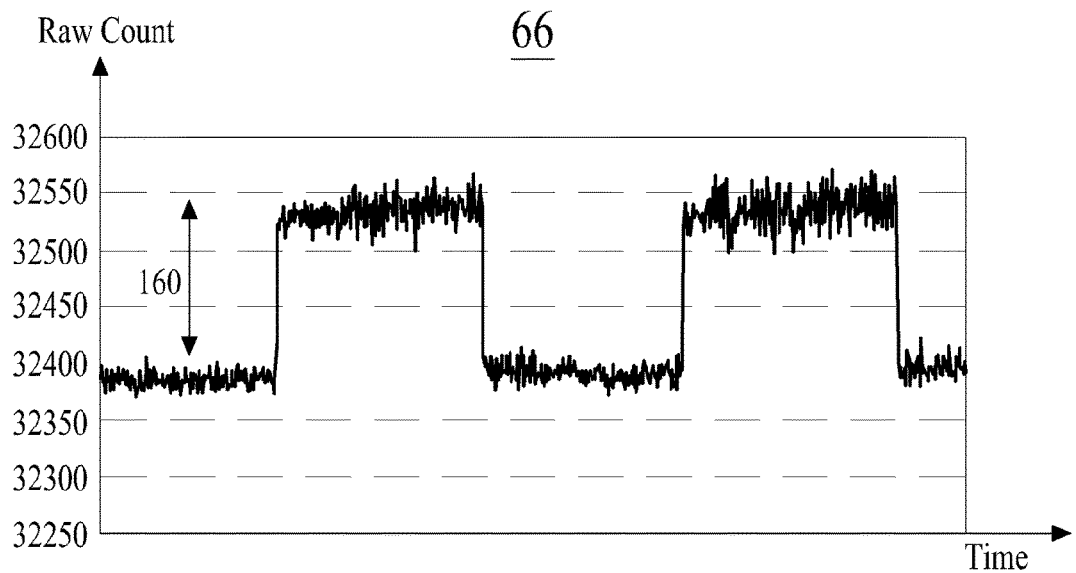

FIG. 4 is a diagram showing a first example of an electrode division method in a display device with an integrated touch screen according to an embodiment of the present invention.

As illustrated in FIG. 4, 160 electrodes can be divided into two groups, namely, an odd group and an even group. The odd group is connected to the respective channels CH1 of the second switching units 126 in the display driver IC 120, and the even group is connected to the respective channels CH2 of the second switching units 126. When the sync signal generator 122 generates the second sync signal "1" indicating the touch driving mode and the switching control signal generator 123 generates the second control signal "01" designating the channel CH1, the respective channels CH1 of the second switching units 126 are connected to the electrodes of the odd group. That is, all the channels CH1 of each of the second switching units 126 are connected to the corresponding electrodes of the odd group. When the sync signal generator 122 generates the second sync signal "1" indicating the touch driving mode and the switching control signal generator 123 generates the second control signal "10" designating the channel CH2, the respective channels CH2 of the second switching units 126 are connected to the electrodes of the even group. Thus in the example of FIG. 4, the electrodes 112 may be divided into groups having specific configurations.

FIGS. 5A to 5D are diagrams respectively showing experiment data of touch sensitivity detected according to the method of FIG. 4.

Figure 6:
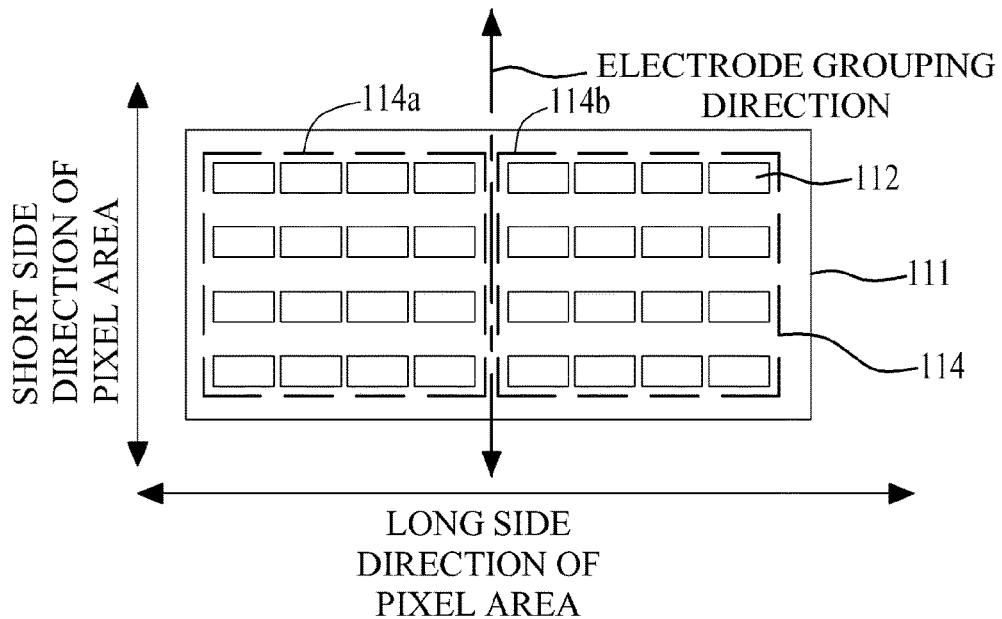
FIG. 6 is a diagram showing a second embodiment of an electrode division method in the display device with integrated touch screen according to an embodiment of the present invention.
Figure 7:
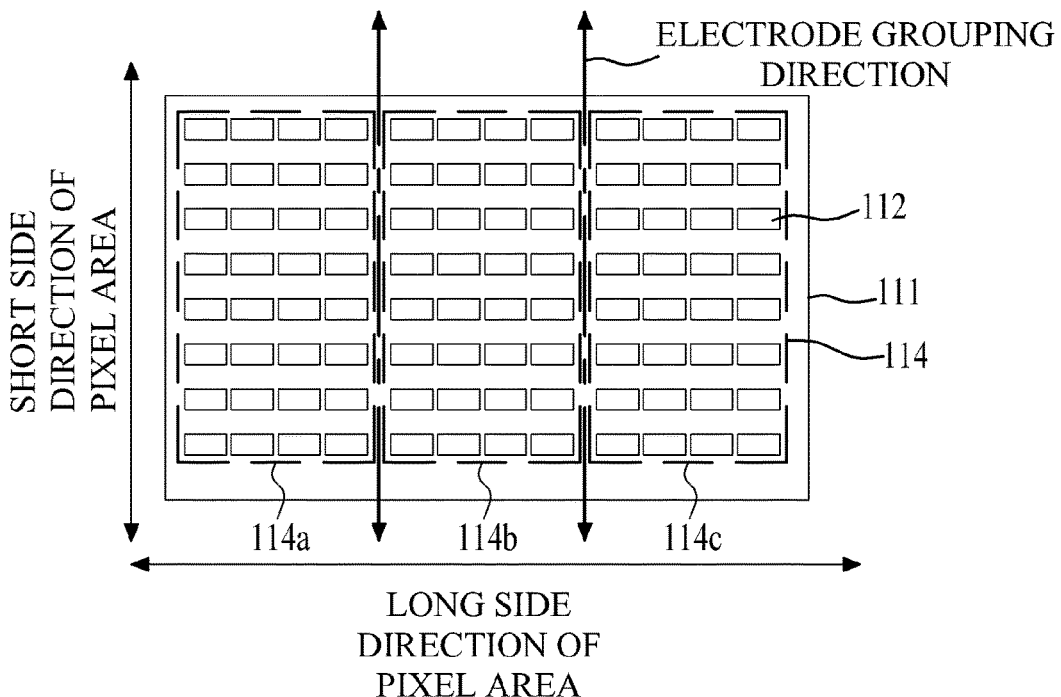
FIG. 7 is a diagram showing a third embodiment of an electrode division method in the display device with integrated touch screen according to an embodiment of the present invention.

In the present experiment data, the X axis indicates time, and the y axis indicates raw count. A raw count value is a value that becomes fundamental for measuring touch sensing, and is to represent a touch sensing signal as a touch clock count value. A touch driving pulse is applied selectively to the odd group and even group of electrodes shown in FIG. 4. Since the electrodes immediately neighboring the electrode numbers 39 and 40 belong to the same even group, when the touch driving pulse is applied to such electrodes, a high touch sensitivity is provided. On the other hand, since some electrodes immediately neighboring the electrode numbers 51 and 66 belong to different electrode groups (i.e., the odd group), the neighboring electrodes are grounded when the touch driving pulse is applied to the electrodes 51 and 66. As a result, the touch sensitivity in such area is lower than the touch sensitivity around the electrode numbers 39 and 40. This can be seen in FIGS. 5A and 5B. Referring to the experiment data, a raw count difference of the electrode number 39 (highlighted in FIG. 4) is 200, a raw count difference of the electrode number 40 is 230, a raw count difference of the electrode number 51 is 100, and a raw count difference of the electrode number 66 is 160. A large raw count difference denotes that the touch sensitivity is better in proportion thereto. In the present experiment data, there are no electrodes (which are connected to different channels of the second switching unit 126) respectively adjacent to the electrode number 39 and the electrode number 40, and thus, the raw count difference of each of the electrode number 39 and electrode number 40 is greater than that of each of the electrode number 51 and electrode number 66, which means that the touch sensitivity in the area of the electrode numbers 39 and 40 is better than the touch sensitivity in the area of the electrode numbers 51 and 66. Thus to enhance the touch sensitivity of the touch panel, it would be desirable to minimize the number of adjacent electrodes that belong to a different group of touch electrodes driven at a different time. Accordingly, FIGS. 6 and 7 provide examples of dividing or grouping the touch electrodes according to the present invention to maximize the touch sensitivity of the display panel. FIGS. 6 and 7 illustrate the examples of a group division method that enables the obtainment of high touch sensitivity, based on the experiment data of FIG. 5. As illustrated in FIGS. 6 and 7, a plurality of electrodes may be divided into a plurality of block type groups. For example, when the pixel area of the panel 110 is rectangular in shape, by dividing the electrodes 112 into a plurality of groups along a short (shorter) side direction to have a rectangular shape, RC delay is reduced between the adjacent electrodes included in different groups, thus increasing the touch sensitivity of the display device.

FIG. 6 is a diagram showing a second example of an electrode division method in the display device with the integrated touch screen according to an embodiment of the present invention.

Referring to FIG. 6, the plurality of electrodes 112 are divided into two block type groups 114 along the direction of the shorter side of the touch screen 111. One (114a) of the groups 114 is connected to the channels CH1 of the second switching units 126 in the display driver IC 120, and the other group 114b is connected to the channels CH2 of the second switching units 126. When the sync signal generator 122 generates the second sync signal "1" indicating the touch driving mode and the switching control signal generator 123 generates the second control signal "01" designating the channel CH1, the respective channels CH1 of the second switching units 126 are connected to all the electrodes of the one group 114a. When the sync signal generator 122 generates the second sync signal "1" indicating the touch driving mode and the switching control signal generator 123 generates the second control signal "10" designating the channel CH2, the respective channels CH2 of the second switching units 126 are connected to all the electrodes of the other group 114b. In the present example, when the pixel area of the panel 110 is rectangular in shape, the block type groups 114 may be formed by dividing the electrodes 112 along a short/shorter side direction of the touch screen 111 to have a rectangular shape or the like, and the numbers of electrodes in each of the divided groups may be the same. As in the present embodiment, by dividing the electrodes into a plurality of groups along a short/shorter side direction of the touch screen 111 to have a rectangular shape or the like, a proximal surface between the groups 114 is minimized and thus, a potential difference between the electrodes 112 connected to the respective channels of the different second switching units 126 is minimized, thereby increasing the touch sensitivity of the panel 110. In the above-described example, the pixel area is the same area as that of the touch screen 111.

FIG. 7 is a diagram showing a third example of an electrode division method in the display device with the integrated touch screen according to an embodiment of the present invention.

Referring to FIG. 7, the electrodes 112 are divided into three block type groups 114 (114a, 114b, 114c), and if the pixel area of the panel 110 is rectangular in shape, similarly to the example of FIG. 6, the block type groups 114 may be formed by dividing the electrodes 112 into a plurality of groups along a short/shorter side direction of the touch screen 111 to have a rectangular shape or the like. In this way, by dividing the electrodes 112 into the plurality of groups 114a, 114b, 114c along the short side direction to have the rectangular or other shape, a proximal surface between the groups 114 is minimized and thus, a potential difference between the electrodes 112 connected to the respective channels of the different second switching units 126 is minimized, thereby increasing the touch sensitivity of the touch screen 111. The detailed description of this example is the same as that of the above-described second example, and thus is not provided.

In the example of FIG. 7, because there exist three groups 114a, 114b and 114c of the electrodes 112, each of the second switching units 126 would have one input and three outputs CH1, CH2 and CH3 which respectively control the three groups 114a, 114b and 114c. As such, the number of second switching units 126 needed may correspond to m/n. In this regard, the switching control signal generator 123 is configured to output appropriate control signals so that each of the groups 114a, 114b and 114c is selectively and independently driven by controlling the output selection among the outputs CH1, CH2 and CH3. The configuration of the first switching units 125 would be the same as that shown in FIGS. 2 and 3. Thus, depending on the number of groups of electrodes formed, the corresponding same number of touch channels for each of the second switching units 126 may be used.

According to the present embodiments, a plurality of electrodes have been exemplarily described as being divided into two groups or three groups, but may be divided into four or more groups according to the number of electrodes.

A driving method of the display device with the integrated touch screen having the above-described configuration, according to an embodiment of the present invention, will be described in detail with reference to FIG. 2.

When the driving mode of the display device with the integrated touch screen according to an embodiment of the present invention is in the display driving mode, the sync signal generator 122 generates the first sync signal "0" to transfer the first sync signal "0" to the first switching units 125, and the switching control signal generator 123 generates the first control signal "00" to transfer the first control signal "00" to the second switching units 126.

The first switching units 125 are switched and connect the common voltage generator 121 to the second switching units 126, according to the first sync signal "0". The second switching units 126 are switched and connect the m electrodes to the channels CH1 and CH2, according to the first control signal "00".

The common voltage generated by the common voltage generator 121 is applied simultaneously to all the m electrodes 112 through the first switching units 125 and the second switching units 126.

When the driving mode of the display device is in the touch driving mode, the sync signal generator 122 generates the second sync signal "1" to transfer the second sync signal "1" to the first switching units 125, and the switching control signal generator 123 generates the second control signal "01" or "10" to transfer the second control signal "01" or "10" to the second switching units 126.

The first switching units 125 are switched and connect the touch IC 130 to the second switching units 126, according to the second sync signal "1". The second switching units 126 are switched and connect one of the two groups 114 to the channels CH1 and CH2, according to the second control signal "01" or "10". When the second control signal is "01", the channels CH1 of the second switching units 126 are connected to the electrodes of one of the two groups 114. When the second control signal is "10", the channels CH2 of the second switching units 126 are connected to the electrodes (which are not connected to the channels CH1) of the other group among the two groups 114.

The touch scan signal generated from the touch IC 130 is applied sequentially to the two groups through the first switching units 125 and the second switching units 126.

Some of the advantages associated with the above-described display device with the integrated touch screen according to an embodiment of the present invention will now be provided.

In the present invention, by applying the common voltage or the touch scan signal to the electrodes of each group through the switching unit that is connected to at least two or more electrode groups of the self-capacitive touch screen, the number of touch ICs and the number of touch IC channels can be reduced which in turn reduces the manufacturing cost of the display device.

Furthermore, in the present invention, the common voltage Vcom is applied directly from the display driver IC to the electrodes without being applied to the electrodes through the touch IC, and thus, image quality can be prevented from being degraded.

According to the embodiments of the present invention, the switching unit is connected to at least two or more electrode groups of the self-capacitive touch screen, and the common voltage or the touch scan signal is applied to the electrodes of each group through the switching unit, thus reducing the number of touch ICs and the number of touch IC channels which in turn reduces the manufacturing cost of the display device.

Moreover, according to the embodiments of the present invention, the common voltage is not applied to the electrodes though the touch IC, but the common voltage is applied directly from the display driver IC to the electrodes, thus preventing image quality from being degraded.

Moreover, according to the embodiments of the present invention, the plurality of electrodes are divided into the plurality of groups, and inter-electrode RC delay is reduced by minimizing a proximal surface between the electrode groups, thus enabling more accurate touch sensing.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for a driving a self-capacitive touch sensitive display device comprising a display panel having a plurality of touch electrodes including at least a first group of touch electrodes including a first touch electrode and a second touch electrode and a second group of touch electrodes including a third touch electrode and a fourth touch electrode, a plurality of touch lines including at least a first touch line, a second touch line, a third touch line, and a fourth touch line, a plurality of pixel electrodes in a pixel area of the display panel, a plurality of data lines electrically connected to the plurality of pixel electrodes, and a display driver Integrated Circuit (IC) including a first multiplexer, a second multiplexer, and a plurality of touch channel outputs including at least a first touch channel output, a second touch channel output, a third touch channel output, and a fourth touch channel output, wherein the first touch electrode is connected to the first channel output via the first touch line, the second touch electrode is connected to the second channel output via the second touch line, the third touch electrode is connected to the third channel output via the third touch line, and the fourth touch electrode is connected to the fourth channel output via the fourth touch line, the method comprising:
providing a common voltage to the first touch electrode, the second touch electrode, the third touch electrode and the fourth touch electrode during a display period via the plurality of touch lines;
providing a touch scan signal to the first touch electrode and the second touch electrode simultaneously during a first part of a touch period;
providing the touch scan signal to the third touch electrode and the fourth touch electrode simultaneously during a second part of the touch period;
connecting selectively to the first touch channel output or the third touch channel output by the first multiplexer during the touch period; and
connecting selectively to the second touch channel output or the fourth touch channel by the second multiplexer during the touch period.

2. The method of claim 1, wherein the display driver Integrated Circuit (IC) further includes a plurality of data channel outputs, and
wherein the plurality of pixel electrodes of the display panel are respectively connected to the plurality of data channel outputs of the display driver Integrated Circuit (IC) via the plurality of data lines.

* * * * *